ized Statesgenericatent [15] 3,688,839
Kirschner [45] Sept. 5, 1972

[54] WATER HEATING AND STORAGE SYSTEM

[72] Inventors: Robert F. Kirschner, Lakeville, Mass.

[73] Assignee: The Patterson-Kelley Co., Inc., East Stroudsburg, Pa.

[22] Filed: Nov. 27, 1970

[21] Appl. No.: 93,342

[52] U.S. Cl. ................... 165/108, 122/33, 126/362, 219/316, 165/132
[51] Int. Cl. ............................................. F24h 01/18
[58] Field of Search ............. 165/132, 108; 126/362; 219/316; 122/33

[56] References Cited

UNITED STATES PATENTS 1,890,263  12/1932  Parent ................... 126/362 X
3,447,560   6/1969  Dodson et al. .......... 126/362 X
3,315,735   4/1967  Stranko ..................... 165/108
3,446,939   5/1969  Morgan et al. ......... 165/108 X Primary Examiner—Albert W. Davis, Jr.
Attorney—Bean & Bean

[57] ABSTRACT

A dual mode operative water heating and storage system including a hot water storage tank having a cold water supply inlet for replenishing water withdrawn from the tank, a conduit system for normally circulating water from a lower to an upper level of the tank and including means for heating the circulated water, means connected into the system for withdrawing heated water up to a given rate of flow which is in excess of the rate at which water is normally circulated through the conduit system, and means for connecting the upper level of the tank in flow communication with the withdrawal means whenever the withdrawal rate exceeds the normal circulation rate.

27 Claims, 3 Drawing Figures

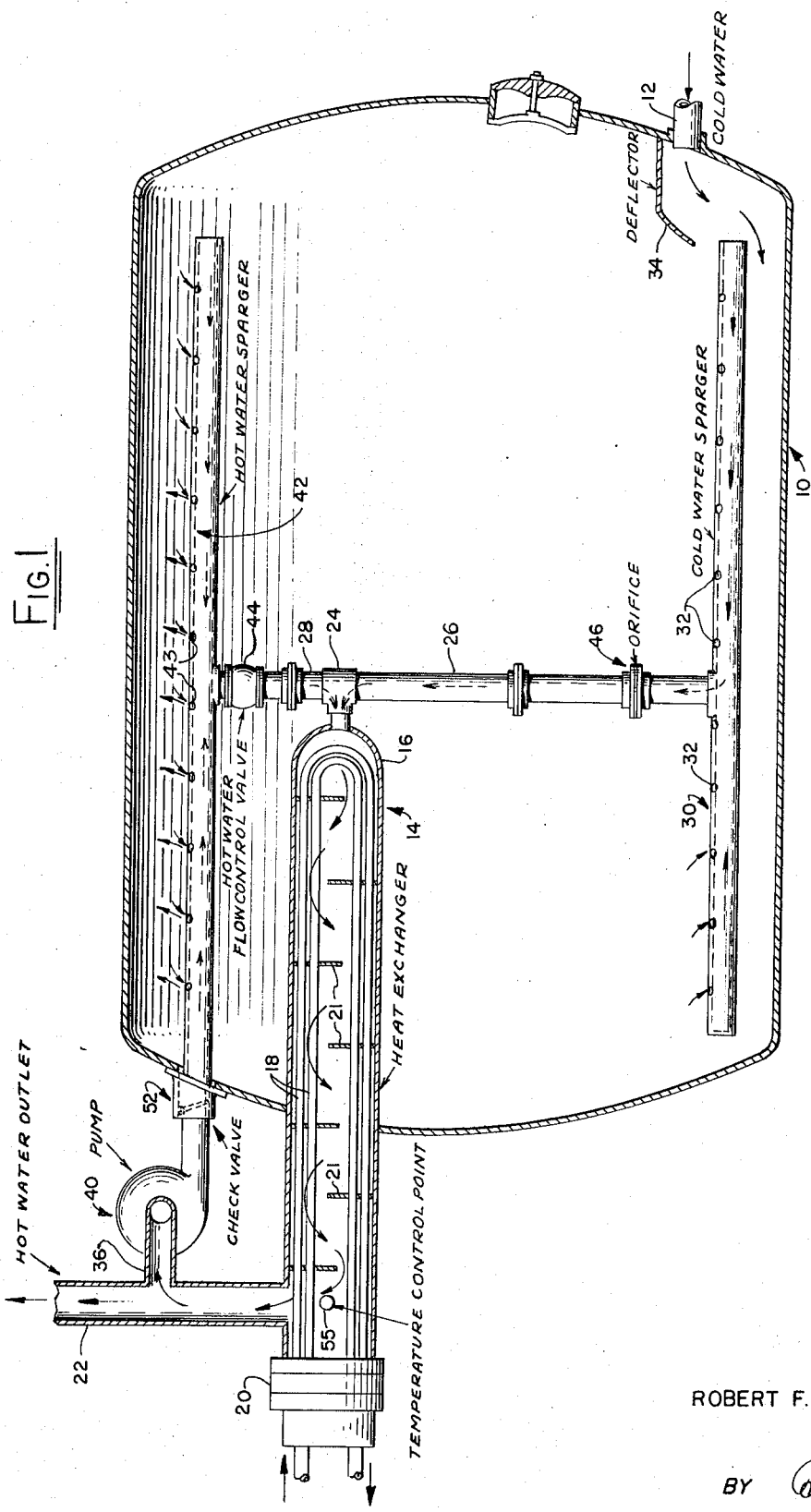

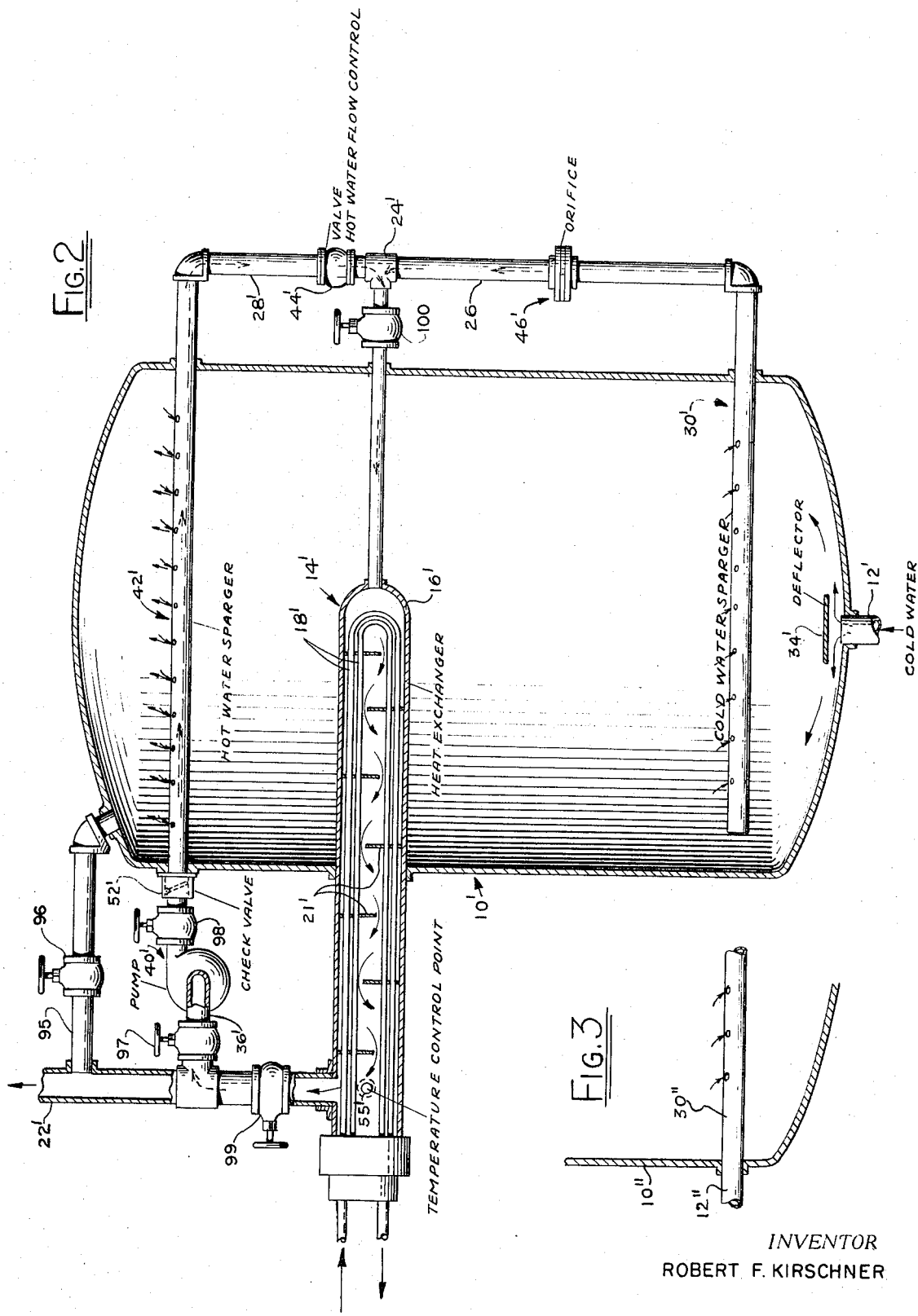

WATER HEATING AND STORAGE SYSTEM

SUMMARY OF THE INVENTION

The present invention relates to a water heating and storage system which is particularly adapted by way of example for use in a multiple dwelling or office building water heating facility or the like, and overcomes certain deficiencies of previous systems.

The invention features provision of a single water heating and storage tank having a cold water supply inlet for replenishing water withdrawn from the tank; and a shrouded heat exchanger, which receives water to be heated at its inner end portion from a novel selective flow source/rate feed conduit system and is connected into a hot water delivery conduit at its outer end portion. The conduit system includes a first conduit leading from a lower intake manifold for drawing in water from substantially throughout the lower level of the tank, and a second conduit leading from a combination intake/outlet upper manifold extending horizontally throughout a substantial portion of the upper level of the tank. In one preferred form of conduit system arrangement the upper manifold extends outwardly of the tank for flow communication with the outlet end portion of the shrouded heat exchanger and includes a continuously running pump normally inducing a constant circulation of water from the lower level of the tank, through the heater, and back into the upper level of the tank.

The first conduit is designed so as to permit only a "normal" rate of flow of water from the lower levels of the tank into the heater, equivalent to the rate of circulation through the pump plus withdrawals from the system at "normal" rates; in accordance with the designed heat exchange recovery rate of the system. A pre-selected flow rate restricting orifice installed in the line of the first conduit provides a practical and convenient method for establishing this first conduit flow rate parameter. The second conduit includes an inline valve device, which is operable to selectively connect the upper manifold in flow communication with the heater only whenever the rate of withdrawal of water through the delivery conduit exceeds the permitted rate of flow of water through the flow limiting orifice of the first conduit, as explained hereinabove.

Thus, during normal circulation operation and/or during normal withdrawals of hot water from the system, heater intake water is drawn solely from the lower level of the tank through the lower manifold; any heated water withdrawn from the system being replaced by cold supply water entering into the lower level of the tank. However, when hot water withdrawal demands are in excess of the flow rate determined by the flow limiting orifice, the valve in the second conduit automatically opens to permit previously heated water to be withdrawn from the upper level of the tank through the upper manifold and into the delivery conduit system, at a rate sufficient to satisfy the "excess" demand.

The system is therefore automatically balanced with respect to storage water heating and hot water delivery requirements, and insures delivery of water at a prescribed temperature, while at the same time maintaining highly desirable temperature stratification conditions interiorly of the tank. By positively promoting stratification conditions within the tank, a smaller tank than conventionally required may be used for any given application.

The present system also provides for a more even and precise control of temperature, and therefore permits a more even draw of energy from the heat source.

DRAWINGS

The nature and mode of operation of the present invention will now be more fully described in the following detailed description taken with the accompanying drawings wherein:

FIG. 1 of the drawing herewith comprises a schematic illustration of one form of the water heating and storage system of the present invention;

FIG. 2 is a drawing corresponding to FIG. 1, but illustrating a modified form of the present invention; and FIG. 3 is a fragmentary view illustrating an alternative construction, which may be employed in either of the systems shown in FIGS. 1 and 2.

DETAILED DESCRIPTION

As illustrated in FIG. 1 of the drawing herewith, the invention may be embodied in a heated water delivery system including a storage tank 10 having a cold water inlet connection 12 for replenishing hot water withdrawn from the tank. A heater unit, designated generally at 14 includes a tubular shaped shroud 16 housing a bundle of return bent heat-exchange tubes 18, which extend from a tube sheet and steam supply assembly 20 closing the outer end of the shroud 16. Alternately disposed baffle plates 21 are preferably arranged within shroud 16 to guide the flow of water therethrough along an undulation or zig-zag path relative to tubes 18 to insure maximum heat exchange efficiency. A heated water delivery conduit 22 is arranged in communication with the interior of the shroud 16 adjacent its delivery end portion, which as shown in the drawing, may be preferably be arranged exteriorly of tank 10.

The inlet end portion of shroud 16 is disposed interiorly of tank 10 and is connected in open communication by means of a conduit-fitting 24 with first and second feed conduits 26 and 28, respectively. The first or lower conduit 26 communicates with the interior of tank 10 by way of example through a lower intake manifold 30, which extends horizontally throughout a substantial portion of the lower level of the tank. Manifold 30 may conveniently be constructed as a tubular conduit perforated at intervals therealong, as indicated at 32, to permit the withdrawal of water from the lower level of the tank in gentle and evenly distributed manner. This construction avoids excessive turbulences and agitations of the stratified cold water within the lower levels of the tank, such as normally occur during draw and heat recovery periods. Also, a deflector 34 is preferably provided to guide the cold water supply entering the tank through inlet connection 12 so as to travel downwardly and across the bottom surface of the tank, thereby further avoiding a breakdown of the natural temperature stratification mechanism operating within the tank.

A conduit 36 is provided to extend from heated water withdrawal conduit 22 to the intake of a continuously running pump 40 and from the discharge of the pump into an upper manifold or "sparger" 42, which extends horizontally throughout a substantial portion of the upper level of the tank. Manifold 42 is perforated at intervals therealong, as indicated at 43, in order to permit the gentle and even introduction of heated water into, or withdrawal of heated water from, the upper level of tank 10, and is arranged to be normally excommunicated from but on occasion in flow communication with said second conduit 28 through means of a valve device 44, which is selectively operable between closed and variably open positions.

Thus, pump 40 normally operates to draw water from across substantially the entire lower level of tank 10, through the manifold 30; first conduit 26; heater unit 14; conduit 22; and to then discharge it through upper manifold 42 across substantially the entire upper level of the tank. By nature, the less dense heated water floats on top of the relatively cold supply water introduced into the lower level of tank 10 in the absence of external turbulating influences.

Valve 44 is a pressure-differential responsive type valve and is adjusted so as to remain closed when operating under pressure differentials such as are encountered only under "normal" operations of the system; as induced by operation of the circulating pump 40 and "normal" withdrawals of heated water within the range of the recovery rate design of the system. Thus, under idling (no withdrawal and/or "normal" withdrawal) conditions, pump 40 operates to gently circulate water from the lower level of the tank, through the heater, and then into the upper level of the tank; thereby maintaining and/or gradually bringing the entire tank contents at or to the desired temperature, without disturbing in the meantime the natural temperature stratification phenomenon within the tank.

However, should withdrawals of hot water through conduit 22 increase substantially above the pump circulation rate, the hot water flow control valve 44 will open so as to allow appropriate amounts of hot water to be drawn from the upper level of the tank in through manifold 42 and to be mixed with water being drawn in through manifold 30; and then to be passed through the heater unit 14 into delivery conduit 22. Thus, the withdrawal of hot water from the upper level of the tank to meet the "excess" demand imposes no appreciable additional load on the heat energy supply system, yet insures that water delivered by conduit 22 to the point of intended use under such condition is at the prescribed temperature.

As explained hereinabove, it is a particular feature of the present invention that the conduit 26 is restricted to convey water at only a prescribed rate, such as by provision of the orifice device as illustrated at 46, which is of a properly pre-selected dimension. Orifice device 46 may be of any suitable design, and for example may simply comprise an apertured disc engaged between opposite face plates, which are threaded onto opposite ends of tubings comprising conduit 26. In any case, the flow aperture of orifice device 46 is sized so as to permit a rate of flow substantially equal to the heat exchange recovery rate of the system before developing a pressure drop across the orifice (at the pump circulation rate) such as will operate to cause the valve 44 to open. While the rate of flow of relatively cold water from the lower level of tank 10 may be limited by merely reducing the diameter of either or both of manifold 30 and first conduit 26, the utilization of device 46 is preferred, since it facilitates initial design and installation and permits the system to be readily adjusted to meet varying requirements of any given installation.

Hence, it will be appreciated that during idling and/or "normal" withdrawal conditions, orifice 46 is operative to permit the requisite rate of flow from the lower level of tank 10, and the valve 44 is then operative to prevent any undesirable short-circuiting of hot water flow from within the upper manifold 42 through conduit 28 and back through the heater unit. However, whenever withdrawals of heated water in excess of the recovery rate of the system are being made, the orifice device 46 induces a differential pressure condition to exist between conduits 26–28 and the interior of tank 10, thereby causing valve 44 to open and permit delivery of an additional supply of previously heated water from the upper level of the tank to flow into and through the upper manifold and the heater unit, and thence out through the delivery conduit.

Particularly in cases where pump 40 is not of the positive displacement variety, it is preferable to provide a flow check valve 52 in the line of the pump discharge, to prevent any back-flow of water from the upper level of the tank in reverse direction through the pump and into the water delivery conduit when heated water withdrawals are being made; thus insuring that all water entering the withdrawal system will be up to the prescribed temperature.

A temperature sensor 55, which is preferably positioned adjacent the outlet end portion of the heater shroud 16, will at all times accurately note the temperature of water passing from the heater unit and will serve to properly control the heat energy supply to the heater unit, as is well known in the art. Should the entire contents of the tank attain the prescribed temperature, the sensor will deenergize the heater until such time as the temperature of the circulating water falls below the desired withdrawal temperature.

The valve 44 may be of any acceptable design. For example, it may be of the spring-loaded pressure-balance type, operating strictly in response to pressure differentials when the system is out of fluid flow "-balance," due to any excessive hot water withdrawal demands. Or, alternatively, the control valve may be of the air pressure actuated type; operationally functional in proportion to readings from a pressure differential sensor and actuator measuring the pressure drop across the orifice device 46 or the withdrawal flow rate within conduit 22.

FIG. 2 illustrates a modified form of the heating system of the present invention, wherein similar components are designated by similar "prime" numerals. Whereas in this form, the heater-storage tank 10' is illustrated as being of the upright type, it is to be understood that the tank may with equal facility be provided in the form of a horizontally disposed tank. In FIG. 2, lower manifold 30', upper manifold 42' and conduit-fitting device 24' are shown as being extended through one side wall of tank 10', so as to position the first and second conduits 26' and 28' exteriorly of the tank in order to facilitate adjustment and/or maintenance of flow control valve 44' and orifice device 46'.

Further FIG. 2 illustrates an arrangement whereby the heating elements 18' may be withdrawn from shroud 16' without loss of water from tank 10', and without interruption of the facility for withdrawal of hot water through delivery conduit 22' from the upper level of the tank. To this end, a by-pass conduit 95 having a normally closed valve 96 is arranged to directly connect conduit 22' into the top of tank 10', and normally open valves 99 and 100 are provided in conduit 22' adjacent the outlet end portion of shroud 16' and in conduit-fitting 24', respectively. Thus, when valves 99 and 100 are closed and valve 96 is open, the interior of shroud 16' is functionally isolated from the rest of the heating system, and conduit 22' is connected in direct flow communication with the top of tank 10'. Further, it is preferable to provide normally open valves 97 and 98 in line 36' at positions upstream and downstream of pump 40' in order to permit maintenance on or replacement of pump 40'.

FIG. 3 illustrates another alternative construction, wherein the cold water supply inlet 12" of tank 10" is connected directly into lower manifold 30". This arrangement may in some cases be desirable from the standpoint that it both simplifies the tank construction and prevents undesirable turbulent water flow patterns within the tank upon admission of cold supply water during a heated water draw period.

Thus, it will be appreciated that the invention provides a novel dual mode operative water heating and storage and delivery system embodying various important features and advantages as set forth hereinabove. While the invention has been illustrated and described with reference only to a heating system employing a steam energized type immersion heater, it will be understood that any other form of heater and heat energy source may be employed.

We claim:

1. A water heating and storage system comprising in combination:
    a hot water storage tank;
    means, including means for heating water passing therethrough, for normally circulating water from a lower region of the tank to an upper region of the tank, thereby tending to establish a reservoir of relatively hot water at least in the upper region of the tank;
    first intake means disposed within the lower region of the tank and connected to the circulation means upstream of the heater means for permitting inflow of water to the circulation means from the lower region at up to a predetermined flow rate;
    second intake means disposed within the upper region of the tank and connected to the circulation means upstream of the heater means;
    outlet means connected to the circulation means downstream of the heater means for delivering heated water to a point of use at up to a flow rate greater than the predetermined flow rate capacity of the first intake means;
    inlet means for supplying relatively cold water to the lower region of the tank to replenish water withdrawn from the tank through the outlet means; and
    normally closed valve means associated with the second intake means for admitting water to the circulation means from the upper region of the tank when the flow rate demand on the outlet means exceeds the predetermined flow rate capacity of the first intake means.

2. A water heating and storage system according to claim 1, wherein the predetermined flow rate capacity of the first intake means is not substantially greater than the rate at which water is normally circulated by said circulation means.

3. A water heating and storage system according to claim 1, wherein the first intake means includes flow restricting orifice means for limiting the rate of flow of water passing to the circulation means from the lower region of the tank.

4. A water heating and storage system according to claim 1, wherein the predetermined flow rate capacity of the first intake means is not substantially greater than the heat exchange recovery rate of the heater means.

5. A water heating and storage system according to claim 1, wherein the first intake means is directly connected to the cold water inlet means.

6. A water heating and storage system according to claim 1, wherein the valve means comprises a pressure-responsive valve that opens in response to the pressure differential created thereacross when the flow rate demand on the outlet means exceeds the predetermined flow rate capacity of the first intake means.

7. A water heating and storage system according to claim 1, wherein:
    the first intake means includes a first manifold extending generally horizontally within the lower region of the tank; and
    the second intake means includes a second manifold extending generally horizontally within the upper region of the tank.

8. A water heating and storage system according to claim 7, wherein the second manifold is connected to the circulation means downstream of the of the heater means for delivering heated water to the upper region of the tank.

9. A water heating and storage system according to claim 7 wherein:
    the first intake means further comprises flow restricting orifice means interposed between the first manifold and the circulation means for limiting the rate of inflow of water through the first manifold; and the valve means comprises a pressure-responsive valve interposed between the second manifold and the circulation means.

10. A water heating and storage system according to claim 9 wherein the flow rate capacity of the first intake means is limited by the flow restricting orifice means to substantially equal to or less than the heat exchange recovery rate of the heater means.

11. A water heating and storage system according to claim 1, wherein the predetermined flow rate capacity of the first intake means is substantially equal to the heat exchange recovery rate of the heater means.

12. A water heating and storage system including in combination;
    tank means having cold water supply inlet means for replenishing water withdrawn from said tank means;

a shroud having an inlet end portion extending inwardly of said tank and having an outlet end portion arranged exteriorly of said tank;

immersion heater means arranged within said shroud for heating water passing therethrough;

hot water withdrawal means connected into said outlet end portion for withdrawing heated water from said tank at up to a given rate of flow;

first water intake means disposed within a lower region of said tank means and connected in flow communication with said inlet end portion for permitting inflow of water to said inlet end portion to up to a rate less than said given rate of flow, thereby to insure that water passing from said lower region is heated up to a desired withdrawal temperature by said heater means;

hot water conduit means connecting said outlet end portion in flow communication with an upper region of said tank and including pump means for normally circulating water between said tank regions successively through said first water intake means, said shroud and said hot water conduit means, thereby tending to establish a reservoir of water at or near said desired withdrawal temperature in at least said upper region of said tank means;

second water intake means disposed within said upper region of said tank means and connected in flow communication with said inlet end portion; and normally closed valve means associated with said second water intake means for admitting water therethrough to said inlet end portion from said upper region whenever the rate of flow of water withdrawn through said hot water withdrawal means is greater than the flow rate capacity of said first water intake means.

13. A water heating and storage system according to claim 12, wherein said cold water supply inlet means is connected into said first water intake means.

14. A water heating and storage system according to claim 12, wherein the maximum flow rate capacity of said first water intake means is not substantially greater than the heat exchange recovery rate of said heater means.

15. A water heating and storage system according to claim 12, wherein said first water intake means includes separate flow restriction means for limiting the rate of flow of water therethrough.

16. A water heating and storage system according to claim 15, wherein said flow restriction means is an orifice defining plate.

17. A water heating and storage system according to claim 12, wherein:

said first water intake means includes an apertured lower manifold extending substantially horizontally within said lower region of said tank means and a vertically extending first conduit connecting said lower manifold to said inlet end portion;

said hot water conduit means includes an apertured upper manifold extending substantially horizontally within said upper region of said tank means;

said second intake means includes a vertically extending second conduit connecting said upper manifold to said inlet end portion; and said valve means are arranged in said second conduit, whereby said valve means admits water from said upper region through said upper manifold and said first conduit to said inlet end portion whenever water is withdrawn from said hot water withdrawal means at a rate greater than the maximum flow rate capacity of said first intake means.

18. A water heating and storage system according to claim 17, wherein said first water intake means includes flow restriction means arranged in said first conduit.

19. A water heating and storage system according to claim 18, wherein said first and second conduits are arranged to extend exteriorly of said tank means to facilitate access to said valve means and said flow restriction means.

20. A water heating storage system according to claim 12 further comprising:

by-pass conduit means, including second normally closed valve means arranged exteriorly of said tank means, connecting said hot water withdrawal means to said upper region of said tank means;

normally open valve means arranged exteriorly of said tank means for controlling flow of water from said outlet end portion to said hot water withdrawal means; and normally open valve means arranged exteriorly of said tank means for controlling flow of water from said first water intake means to said inlet end portion, whereby when said normally open valve means are closed and said second normally closed valve means is opened, said immersion heater may be withdrawn from said shroud without loss of water from said tank means and hot water may be withdrawn through said hot water withdrawal means directly from said upper region of said tank means.

21. A water heating and storage system according to claim 20, wherein normally open valve means are arranged exteriorly of said tank means in said hot water conduit means upstream and downstream of said pump means, such that when the last said valve means are closed said pump means may be removed without loss of water from said tank means.

22. A water heating and storage system according to claim 12, wherein said hot water conduit means includes a conduit extending into said upper region of said tank means for delivering hot water thereto, and said second water intake means is part comprised by said conduit.

23. A water heating and storage system according to claim 17, wherein said first and second conduits are located within said tank means.

24. A water heating and storage system according to claim 12, wherein said valve means comprises a pressure-responsive valve that opens in response to the pressure differential created thereacross when the flow rate demand on said hot water withdrawal means exceeds the maximum flow rate capacity of said first water intake means.

25. A water heating and storage system comprising in combination:

a hot water storage tank including a relatively cold water supply inlet for replenishing water withdrawn from said tank;

outlet means for withdrawing heated water from said tank at up to a given rate of flow;

a conduit system for normally circulating water from a lower to an upper region in said tank, said conduit system having heating means for heating water being circulated therethrough, thereby tending to bring the contents of said tank at least at said upper region up to predetermined withdrawal temperature, said outlet means being connected in-flow communication with said conduit system downstream of said heater means;

first and second tank water intake means in said conduit system upstream of said heater means, said first intake means being disposed in said lower region for supplying water to said heater means at up to an amount below said given rate of flow, and said second intake means being disposed in said upper region for supplying a flow of water from said upper region to said heater means whenever the rate at which heated water is withdrawn through said outlet means exceeds said amount at a rate accommodating for the difference between said withdrawal rate and said amount.

26. A water heating and storage system according to claim 25, wherein said first intake means produces a predetermined pressure differential in said conduit system upstream of said heater means relative to said tank whenever said first intake means tends to take in water exceeding said amount due to the hot water withdrawal demand on said outlet means exceeding said amount, and said second intake means includes valve means operable by said pressure differential.

27. A water heating and storage system according to claim 1, wherein the circulation means includes a conduit extending into the upper region of the tank for delivering heated water thereto, and the second intake means is in part comprised by said conduit.

* * * * *

PO-1050
(5/69)

UNITED STATES PATENT OFFICE
CERTIFICATE OF CORRECTION

Patent No. 3,688,339      Dated September 5, 1972

Inventor(s) Robert F. Kirschner

It is certified that error appears in the above-identified patent and that said Letters Patent are hereby corrected as shown below:

Column 7, lines 2, 3, 8 and 19, "said tank" should read --said tank means--;

Column 8, line 1, "are" should read --is--.

Signed and sealed this 13th day of March 1973.

(SEAL)
Attest:

EDWARD M. FLETCHER, JR.            ROBERT GOTTSCHALK
Attesting Officer                 Commissioner of Patents